(12) United States Patent
Saporito (10) Patent No.: US 12,137,698 B2
(45) Date of Patent: Nov. 12, 2024

(54) MULTILAYER STRUCTURE FOR ACTIVE PACKAGING, PROCESS AND METHOD OF USING THE SAME

(71) Applicants: Decco Worldwide Post-Harvest Holdings B.V., Rotterdam (NL); UPL LTD, Haldia (IN)

(72) Inventor: Francesco Saporito, Catania (IT)

(73) Assignees: DECCO WORLDWIDE POST-HARVEST HOLDINGS B.V., Rotterdam (NL); UPL LTD, Haldia (IN)

( * ) Notice: Subject to any disclaimer, the term of this patent is extended or adjusted under 35 U.S.C. 154(b) by 0 days.

(21) Appl. No.: 17/426,031

(22) PCT Filed: Jan. 31, 2020

(86) PCT No.: PCT/IB2020/050783
§ 371 (c)(1),
(2) Date: Jul. 28, 2021

(87) PCT Pub. No.: WO2020/157714
PCT Pub. Date: Aug. 6, 2020

(65) Prior Publication Data
US 2024/0122191 A1 Apr. 18, 2024

(30) Foreign Application Priority Data
Feb. 1, 2019 (IN) .............................. 201931004050

(51) Int. Cl.
*A23B 7/152* (2006.01)
*B32B 7/12* (2006.01)
(Continued)

(52) U.S. Cl.
CPC ................ *A23B 7/152* (2013.01); *B32B 7/12* (2013.01); *B32B 27/08* (2013.01); *B32B 27/10* (2013.01);
(Continued)

(58) Field of Classification Search
CPC ......... A23B 7/152; C08J 7/0427; C08J 5/124; C08J 2323/06; B32B 7/12; B32B 27/08;
(Continued)

(56) References Cited

U.S. PATENT DOCUMENTS 6,776,998 B1 8/2004 Corrigan
2004/0131518 A1 7/2004 Quintanar Santibanez et al.
(Continued)

FOREIGN PATENT DOCUMENTS

CN 101601420 A 12/2009
EP 0351636 A2 * 1/1990
(Continued)

OTHER PUBLICATIONS

International Search Report and Written Opinion for International Application PCT/IB2020/050783; International Filing Date: Jan. 31, 2020; Date of Mailing: Mar. 18, 2020; 16 pages.

*Primary Examiner* — Brent T O'Hern
(74) *Attorney, Agent, or Firm* — CANTOR COLBURN LLP (57) ABSTRACT

A multilayer sheet for controlling growth of post-harvest pathogens in agricultural product, use thereof for controlling growth of post-harvest pathogens during packaging, storing and/or transportation of agricultural products, and a method comprising the use thereof.

12 Claims, 5 Drawing Sheets

(51) Int. Cl.
| | |
|---|---|
| *B32B 27/08* | (2006.01) |
| *B32B 27/10* | (2006.01) |
| *B32B 37/12* | (2006.01) |
| *B32B 38/00* | (2006.01) |
| *B65D 65/42* | (2006.01) |
| *B65D 65/46* | (2006.01) |
| *B65D 81/28* | (2006.01) |
| *B65D 85/34* | (2006.01) |
| *C08J 5/12* | (2006.01) |
| *C08J 7/04* | (2020.01) |

(52) U.S. Cl.
CPC ............ *B32B 37/12* (2013.01); *B32B 38/145* (2013.01); *B32B 38/164* (2013.01); *B65D 65/42* (2013.01); *B65D 65/466* (2013.01); *B65D 81/28* (2013.01); *B65D 85/34* (2013.01); *C08J 5/124* (2013.01); *C08J 7/0427* (2020.01); *B32B 2250/02* (2013.01); *B32B 2255/10* (2013.01); *B32B 2255/12* (2013.01); *B32B 2255/26* (2013.01); *B32B 2307/7163* (2013.01); *B32B 2439/70* (2013.01); *C08J 2323/06* (2013.01)

(58) Field of Classification Search
CPC ....... B32B 27/10; B32B 37/12; B32B 38/145; B32B 38/164; B32B 2250/02; B32B 2255/10; B32B 2255/12; B32B 2255/26; B32B 2307/7163; B32B 2439/70; B65D 65/42; B65D 65/466; B65D 81/28; B65D 85/34
USPC ......................................................... 426/316
See application file for complete search history.

(56) References Cited

U.S. PATENT DOCUMENTS

| | | |
|---|---|---|
| 2005/0106380 A1 | 5/2005 | Gray et al. |
| 2012/0141642 A1 | 6/2012 | Kubik et al. |
| 2015/0017380 A1 | 1/2015 | Versteylen et al. |

FOREIGN PATENT DOCUMENTS

| | | | |
|---|---|---|---|
| FR | 2313870 A1 | 1/1977 | |
| WO | 2002091861 A1 | 11/2002 | |
| WO | WO-2009051594 A1 * | 4/2009 | ............... A23B 4/16 |

\* cited by examiner

MULTILAYER STRUCTURE FOR ACTIVE PACKAGING, PROCESS AND METHOD OF USING THE SAME

CROSS REFERENCE TO RELATED APPLICATIONS

This application is a National Stage application of PCT/IB2020/050783, filed Jan. 31, 2020, which claims the benefit of priority to Indian patent application No. 201931004050, filed Feb. 1, 2019, both of which are incorporated by reference in their entirety herein.

FIELD OF INVENTION

The present invention relates to a multilayer structure for an active packaging aid. More particularly, the present invention relates to a multilayer sheet comprising an active agent or precursor of active agent that inhibits and reduce the growth of post-harvest pathogens during transportation and storage of agricultural products. The present invention also relates to a method of making and using said multilayer sheet for inhibiting and reducing the growth of post-harvest pathogens during the transportation and/or the storage.

BACKGROUND OF THE INVENTION

Postharvest diseases cause considerable losses to harvested products for example fruits and vegetables during transportation and storage. Both quantitative and qualitative losses occur at all stages in the post-harvest handling system of the distribution chain of perishables (from harvesting, through handling, packing, storage and transportation to final delivery of the fresh produce to the consumer).

*Botrytis cinerea* Pers. Fr., a ubiquitous fungal pathogen, causes gray mold rot on a large number of economically important agricultural and horticultural crops. It is the most common postharvest pathogen of table grapes in most regions of the world, leading to severe losses of table grapes after harvest. Table grapes are non-climacteric fruits with relatively low physiological activity, and they are subjected to major water-loss and softening during postharvest handling and cold storage, which can result in stem browning, berry shatter, wilting of berries. Grapes are very sensitive to fungal infection (*Botrytis cinerea*) and other diseases, like gray mold, which is very aggressive.

The study of alternative methods to control postharvest decay has developed over several decades, along with the demand for safer storage methods. A number of alternatives have been investigated for postharvest treatment of table grapes with some success. Sulphur dioxide gas is effective against molds and fungi and has been commonly used to control the decomposition will gray mold (*Botrytis cinerea* sp) in grapes and other products. Currently the table grape industry uses sulphur dioxide ($SO_2$) generator pads that are placed in cartons/packs containing table grapes to generate gaseous sulphur dioxide in the carton preventing the growth on the grapes of certain forms of fungi where the grapes are to be shipped over long distances or stored. Mostly, $SO_2$ based techniques use the same active ingredient namely sodium metabisulfite ($Na_2S_2O_5$) although in different formulations with one or two different release phases, quick and/or slow.

FR2313870 discloses a method of preserving the fruits and vegetables using a paper based three layers sheet containing metabisulphite. The problems associated with this product are: the powder accumulates in the corner of each bag. The powder amount packed in each bag is too high and when the operator takes from the packaging and place the pad vertically (before laying down in the fruit box) the powder accumulates and remains concentrated in the bag's corner: too much powder concentrated in a single point. Especially in case of high moisture/condensation the result is that the release is completely uneven, not well distributed, coming only from few single points. The berries that are under these points can be damaged by SO2 excess. Additionally, there's not enough protection against condensation. During conservation and, especially, transport very often cold chain is interrupted and temperature fluctuation goes on. When temperature goes down again condensation will occur in the packed fruit box. The structure of this invention does not offer enough control and the resulting emission varies too much according to the environmental control. Moreover, the lack of emission control will not only cause damage to the fruit but will also deplete too fast the sodium metabisulphite and leave grapes unprotected against decay during further storage. In case of moisture excess the pad materials degrade.

IN181228 discloses PET sandwich sheet which are laminated or glued using hotmelt adhesive comprising $Na_2S_2O_5$ granule coated over a non-woven support for fast release of $SO_2$ and $Na_2S_2O_5$ granules dispersed in a wax matrix for slow release of $SO_2$. The main disadvantage of this PET sandwich sheet is that it releases exhaust chemicals on fruit from the edges.

U.S. Pat. No. 6,776,998 disclose a packaging film for retarding fungal and mold growth in packaged fruit, for producing a plastic liner bag. The film is produced from a polymer blend and sodium metabisulphite for releasing $SO_2$ inside the bag. The main disadvantage of this invention is that the active ingredient is distributed over all the bag and, since $SO_2$ is heavier than air, the main efficient part is only the one that stays over the fruit, while the other (walls and bottom) contributes much less to the result. Secondly the invention cannot provide two really separated release phases (fast and slow) as the product in sheet form, with sodium metabisulphite placed in different separated layers.

In addition, there are some products available in the market providing fast release of $SO_2$ from $Na_2S_2O_5$ in powder form contained in pouches together with coadjutants. In this packaging sheets there is no homogeneous distribution of active and the product doesn't meet some market requirements because powder is visible.

With new market development around the world, it becomes a challenge to protect and store the agricultural products for longer to reach the market with superior quality.

Therefore, there exist a need for improved packaging aid to prevent and control unwanted biological growth in agriculture products during storage and particularly in retarding fungal or mould growth in packaged fruits. The present invention addresses the post-harvest problems during transportation and storage of agricultural products, specifically grapes.

The present invention thus provides a biodegradable multilayer sheet which comprises at least one layer carrying an active agent or a precursor of active agent having antifungal properties to control and inhibit the fungal infection ameliorating the problems associated with the conventional packaging as described above.

SUMMARY OF THE INVENTION

According to an aspect of the present invention, there is provided a packaging aid comprising a sheet printed/engraved with at least one active agent or precursor of active agent for preventing and inhibiting the growth of certain forms of fungi of agricultural products.

In an aspect the present invention provides a multilayer sheet, comprising:
- a polymeric layer; and
- at least one active layer comprising a composition containing at least one active agent or its precursor.

In another aspect the present invention provides a multilayer sheet, comprising:
- a polymeric layer; and
- a printed layer comprising a composition containing at least one active agent or its precursor.

In another aspect the present invention provides a multilayer sheet, comprising:
- a polymeric layer;
- a printed layer comprising a fast-release composition comprising at least one active agent or its precursor; and
- a barrier layer comprising a composition comprising at least one active agent or its precursor.

In another aspect the present invention provides use of multilayer sheet comprising a polymeric layer and at least one active layer comprising a composition containing at least one active agent or its precursor for controlling growth of post-harvest pathogens during packaging, storing and/or transportation of agricultural products.

In another aspect the present invention provides a process for making a multilayer sheet, comprising the steps of:
a) printing a composition comprising at least one active agent or its precursor on a polymeric support to form a printed layer,
b) drying the printed layer; and
c) bonding one side of the printed layer with one side of a polymeric layer.

In another aspect the present invention provides a package comprising a multilayer sheet comprising a polymeric layer and at least one active layer comprising a composition containing at least one active agent or its precursor, for controlling the growth of post-harvest pathogens in the packaged agricultural products.

Another advantage of the present invention is to provide a package system for agricultural products during packaging, storage, transportation, distribution and marketing, offering several advantages such as ease of handling, ease of use, reduced spillage and waste disposal.

In another aspect the present invention provides a method of controlling growth of post-harvest pathogens in agricultural products comprising contacting the multilayer sheet with agricultural products during packaging, storing and transportation.

BRIEF DESCRIPTION OF THE DRAWINGS

For a better understanding of the present invention, and to show how the same may be carried into effect, reference will now be made, by way of example, to the accompanying drawing in which.

DETAILED DESCRIPTION OF THE INVENTION

For the purposes of the following detailed description, it is to be understood that the invention may assume various alternative variations of the present invention.

Thus, before describing the present invention in detail, it is to be understood that this invention is not limited to particularly exemplified systems or process parameters that may of course, vary. It is also to be understood that the terminology used herein is for the purpose of describing particular embodiments of the invention only and is not intended to limit the scope of the invention in any manner. The invention is not limited to various embodiments given in this specification. Unless otherwise defined, all technical and scientific terms used herein have the same meaning as commonly understood by one of ordinary skill in the art to which this invention pertains.

It must be noted that, as used in this specification, the singular forms "a," "an" and "the" include plural referents unless the content clearly dictates otherwise. The terms "preferred" and "preferably" refer to embodiments of the invention that may afford certain benefits, under certain circumstances. However, other embodiments may also be preferred, under the same or other circumstances. Furthermore, the recitation of one or more preferred embodiments does not imply that other embodiments are not useful and is not intended to exclude other embodiments from the scope of the invention.

The term "comprising" and variations thereof as used herein is used synonymously with the term "including" and variations thereof and are open, non-limiting terms. Although the terms "comprising" and "including" have been used herein to describe various embodiments, the terms "consisting essentially of and "consisting of can be used in place of "comprising" and "including" to provide for more specific embodiments of the invention and are also disclosed. Other than in the examples, or where otherwise noted, all numbers expressing quantities of ingredients, reaction conditions, and so forth used in the specification and claims are to be understood at the very least, and not as an attempt to limit the application of the doctrine of equivalents to the scope of the claims, to be construed in light of the number of significant digits and ordinary rounding approaches.

As used herein, the term "engraved" or "printing" are used synonymously and refers to the application of the active ingredient on the support surface by printing device or machine leading to zero risk of releasing the solid substance of chemical active compound.

The present invention provides a packaging sheet for preserving agricultural products comprising a layer engraved with a composition comprising an active agent or precursor of active agent, said sheet releases the active agent and efficiently prevent or inhibit the microbial growth in grapes.

According to an aspect, the present invention provides an active packaging multilayers structure comprising a sheet engraved with a composition containing at least one active agent or a precursor of active agent for controlling and inhibiting the growth of certain forms of fungi in agricultural products.

In another aspect the present invention provides a multilayer sheet comprising at least one biodegradable or polymeric layer engraved with a composition containing at least one active agent or a precursor of active agent.

In an aspect the present invention provides a biodegradable multilayer sheet comprising
a) a polymeric layer engraved with at least one active agent or precursor of active agent and
b) optionally a barrier layer or printable layer.

In an aspect the present invention provides a multilayer sheet comprising
a) a biodegradable layer engraved with at least one active agent or precursor of active agent and
b) a barrier layer or printable layer.

In another aspect the present invention provides a multilayer sheet comprising
a) a polymeric layer engraved with at least one active agent or precursor of active agent;
b) a barrier layer or printable layer;
c) a biodegradable control release layer engraved with at least one active agent or precursor of active agent and
d) optionally a polymeric layer or a biodegradable layer.

In an aspect the present invention provides a multilayer sheet, comprising:
a polymeric layer; and
at least one active layer comprising a composition containing at least one active agent or its precursor.

In another aspect the present invention provides a multilayer sheet, comprising:
a polymeric layer; and
a printed layer comprising a composition containing at least one active agent or its precursor.

In another aspect the present invention provides a multilayer sheet, comprising:
a polymeric layer;
a printed layer comprising a fast-release composition comprising at least one active agent or its precursor; and
a barrier layer comprising a composition comprising at least one active agent or its precursor.

In one embodiment, the active layer comprises a printed layer and/or a barrier layer.

In one embodiment, the active layer comprises a printed layer.

In another embodiment, the active layer comprises a barrier layer.

In another embodiment, the active layer comprises a printed layer and a barrier layer.

In one embodiment, the polymeric layer and active layer are biodegradable.

In one embodiment, the polymeric layer and active layer are bonded using a biodegradable food grade adhesive material to form a biodegradable multilayer sheet.

In an embodiment, the composition comprising at least one active agent or its precursor is printed on the active layer.

In an embodiment the multilayer sheet is used for generating gaseous active agent for controlling and inhibiting the microbiological infection in agricultural products.

In an embodiment the agricultural product is selected from fruits or vegetables.

In an embodiment the fruit is selected from berry, grapes, blueberry, lychee, grapes or any other climatic or non-climatic fruit. In an embodiment the agricultural product is grapes.

These generators include the active compound or mixture of precursor of active compounds fungicidal gas.

In an embodiment the active agent is selected from, but not limited to, sodium meta bisulphite, sodium bisulfite, sodium sulphite, potassium metabisulhite, sodium percarbonate, 1-MCP generators, essential oils, ClO2 generators, H2O2 generator (carbamides) acetic acid and the like.

In an embodiment the gaseous active agent or precursor of gaseous active agent, desirably is suitable for printing means receptive for printing and desirably is printable with conventional printing equipment. The substance or compound which upon contact with the moisture generate the active agent or gaseous active agent, known to a person skilled in the art, can be used.

In an embodiment the active agent is gaseous active agent preferably sulphur dioxide controlling and inhibiting the growth of certain forms of fungi.

In an embodiment the precursor of active agent is sodium metabisulphate.

In an embodiment sodium metabisulphite is used in the range from 10 g/m$^2$ to 70 g/m$^2$.

In an embodiment the multilayer sheet of the present invention is used as sulphur dioxide generator for controlling post-harvest decay in fruits.

In one embodiment, the polymeric layer is biodegradable polymer coated paper.

In one preferred embodiment, the polymeric layer is polyethylene coated paper.

In an embodiment, the polymer coated paper layer is engraved with sulphur dioxide generator.

In an embodiment the barrier layer or printable layer comprises polyethylene, polypropylene, polyester, polyamide, polylactic acid, polyvinyl chloride, polyethylene terephthalate, polyethylene terephthalate glycol, paper board aluminum, metal, polypropylene-viscose blended or combinations thereof.

In an embodiment polymeric layer comprises polyethylene, polypropylene, polyester, LHDPE, HDPE, semiwater semi-permeable polymer, polyamide, polylactic acid, polyvinyl chloride, polyethylene terephthalate, polyethylene terephthalate glycol, paper board aluminum, metal, polypropylene-viscose blend, food grade resins for example polycarbonate based resin, polyolefin based resin or combinations thereof.

In an embodiment the barrier layer or printable layer or polymeric layer comprises paper or polyolefins such as polyethylene, polypropylene.

In an embodiment the printable layer or polymeric layer is a sealing layer.

In an embodiment the printable layer is printed with a label information.

In an embodiment the printable layer is a polymeric layer.

In an embodiment barrier layer or printable layer comprising one print side to print the label that blocks the release of active ingredient.

In an embodiment, barrier layer or printable layer blocks the release of active ingredient, absorbing at a reduced rate the excess of humidity when placed in the container stored with agricultural product, significantly reducing the fungus decay rise. Thus, the sheet of the present invention has significant dual character that it protects agricultural product by releasing the active ingredient and absorbs the excess of moisture that determines condensation leading to fungal growth.

In an embodiment, the biodegradable layer engraved with at least one active agent or precursor of active agent provide fast release of the active agent.

In an embodiment, the biodegradable layer engraved with at least one active agent or precursor of active agent releases active ingredient in a controlled manner.

In an embodiment, the biodegradable layer comprises cellulose, natural polymers or any biodegradable material used in food packaging.

In an embodiment, the biodegradable controlled release polymeric layer engraved with at least one active agent or precursor of active agent and control release agent.

In an embodiment, the biodegradable layer is paper layer.

In an embodiment, the biodegradable control release polymeric layer engraved with at least one active agent or precursor of active agent.

In an embodiment the control release agent is food grade resin.

In an embodiment the control release agent is selected from polyolefins for example HDPE, LDPE, polypropylene, polystyrene, polyvinylchloride, PET, polycarbonate based resin and the like or combinations thereof.

In an embodiment the biodegradable controlled release polymeric layer engraved with at least one active agent or precursor of active agent provides slow release of the active agent. In some embodiment, the biodegradable layer is paper layer or semi water-permeable layer. In an embodiment, the biodegradable layer is a paper layer.

In an embodiment, the polymeric layer comprises polyethylene, polypropylene, polyester, polyamide, polylactic acid, polyvinyl chloride, polyethylene terephthalate, polyethylene terephthalate glycol, paper board aluminium, metal and polypropylene-viscose blend.

In an embodiment the biodegradable, polymeric layer, polymeric layer, printed layer and/or barrier layer overlapping each other to form a compact multilayer sheet of the present invention.

In an embodiment the sheet can comprise an adhesive to attach, adhere, glue, fuse, bond etc., the two or more layers together to form a multilayer sheet.

In an embodiment the present invention provides a sheet comprising at least one biodegradable layer containing at least one precursor of active agent which allows fast and/or slow release of gaseous active agent to inhibit the microbial growth.

In another aspect the present invention provides single release and dual release multilayer sheet for inhibiting development of fungi growth during the transportation and storage of agricultural products over long intervals respectively.

In an embodiment the multilayer sheet is a dual release sheet.

In an embodiment the multilayer dual release sheet provides fast release of active ingredient and control/slow release of the active ingredient simultaneously.

In an embodiment the multilayer sheet is a single release sheet.

In an embodiment the multilayer single release sheet provides fast release of active ingredient.

In an embodiment the multilayer single release sheet provides slow/controlled release of active ingredient.

In an embodiment the application of engraving an active ingredient on the multilayer sheet provided uniform distribution of the active ingredient in the system with benefits of the mechanical or barrier property.

In an embodiment the sheet of the present invention is engraved or printed with a composition comprising sodium metabisulphite as sulphur dioxide precursor.

In an embodiment the sheet comprises at least one polymeric film layer bonded with printed layer engraved with a composition containing sodium metabisulphite as sulphur dioxide generator intended to come in contact with moisture/water, releases the active agent, sulphur dioxide to prevent or inhibit the microbial growth in fruits.

In an embodiment, the average total thickness of dual release multi-layer sheet of the present invention is in the range of about 100 micrometer (μm) to about 300 micrometer (μm).

In an embodiment, the average total thickness of dual release multi-layer sheet of the present invention is in the range of about 150 micrometer (μm) to about 200 micrometer (μm).

In an embodiment, the average total thickness of single release multi-layer sheet of the present invention is in the range of about 50 μm to about 150 μm.

The individual layer in the sheet may have a minimum thickness of about 10 μm to about 20 μm and depending on their functionality.

In an embodiment the present invention provides effective and easily portable active packaging multilayer sheet structure for treatment of post-harvest decay in fruits, wherein said fruits are contacted with sheet comprising at least one layer engraved with an active agent or precursor of active agent.

In an embodiment the present invention provides a composition comprising at least active agent or precursor of active agent and an agrochemically acceptable carrier.

In an embodiment the present invention the agrochemically acceptable carrier is suitable liquid carrier or co-formulant.

The suitable liquid carrier or co-formulant that may be employed in a composition of the present invention may include one or more organic solvent, food grade resin, essential oil, surfactant and additional liquid carriers. The essential oil can be selected from the group consisting of mineral oil, aromatic solvents, paraffinic oils, and the like; vegetable oils such as soybean oil, rapeseed oil, olive oil, castor oil, sunflower seed oil, coconut oil, corn oil, cottonseed oil, linseed oil, palm oil, peanut oil, safflower oil, sesame oil, tung oil and the like; esters of the above vegetable oils; esters of monoalcohols or dihydric, trihydric, or other lower polyalcohols (4-6 hydroxy containing), such as 2-ethyl hexyl stearate, n-butyl oleate, isopropyl myristate, propylene glycol dioleate, di-octyl succinate, di-butyl adipate, di-octyl phthalate and the like; esters of mono, di and polycarboxylic acids and the like. Organic solvents include, but are not limited to, toluene, xylene, petroleum naphtha, acetone, methyl ethyl ketone, cyclohexanone, trichloroethylene, perchloroethylene, ethyl acetate, amyl acetate, butyl acetate, propylene glycol monomethyl ether and diethylene glycol monomethyl ether, methyl alcohol, ethyl alcohol, isopropyl alcohol, amyl alcohol, ethylene glycol, propylene glycol, glycerine, N-methyl-2-pyrrolidinone, N,N-dimethyl alkylamides, dimethyl sulfoxide and not water. Surfactants include anionic, nonionic, amphoteric and cationic surfactants. Preferred surfactants include sorbitan oleates, polysorbate 40/60/80. The preferred food grade resin but not limited to, include dextrines, dextrin derivated resins, cellulose derivated resins and or other food grade or not food grade resins like polyvinyl acetate (PVA), polycarboxylates, silicates and the like.

The co-formulant is typically present in the composition in an amount of from about 1 to about 99% by weight, preferably from about 10 to about 95% by weight, and most preferably from about 20 to about 90% by weight.

The active ingredient is used in the composition in an amount of about 1 to about 99% by weight, preferably from about 10 to about 95% by weight, and most preferably from about to about 90% by weight.

In an embodiment the active ingredient is used in the composition in an amount of in an amount of about 1 to about 99% by weight, preferably from about 10 to about 80% by weight more preferably from about 20 to 60% by weight.

In an embodiment the present sheet comprises a biodegradable polymeric film layer engraved with a composition containing sodium metabisulphite as sulphur dioxide precursor, bonded to a biodegradable polymer layer (or biodegradable polymer coated paper layer) acting as a barrier for generating gaseous sulphur dioxide to form a compact structure of multilayer sheet.

In an embodiment the sheet comprises a polymeric film layer engraved with a composition containing sodium metabisulphite as sulphur dioxide precursor, bonded to a polymer layer or biodegradable polymer coated paper layer, acting as a barrier layer. The resulting structure is then bonded on the other side with a polymeric layer (or with a paper layer) engraved with a composition containing sodium metabisulphite for generating gaseous sulphur dioxide to form a compact structure of multilayer sheet.

The sheet according to the disclosure of the present invention release the active sulphur dioxide from the engraved film when it comes in contact with moisture/water.

The main advantage of the present technique of engraving the active agent or precursor of active agent in the packaging sheet is that the solution containing active agent when applied on the biodegradable layer is perfectly distributed all over the sheet and the co-formulants are perfectly and very homogeneously surrounding active agents (or the precursors) releasing active agent efficiently to control and treat the fungus in fruits or vegetables when they are packed with such sheet during storage and transportation. The present sheet when comes in contact with moisture starts releasing sulphur dioxide active agent from the centre and peripheral parts of sheet sufficiently to control the fungus in agriculture products at post-harvest stage. According to the present invention the release of sulphur dioxide active agent is homogenous surrounding distribution avoids preferential channels for moisture and gases is very important to grant the proper releasing reaction control.

Another important advantage of the multilayer sheet of the present invention is that reduces the water excess leading to condensation that promotes microbial growth.

In an embodiment the multilayer sheet of the present invention can be placed at the bottom in a packaging container and agricultural product packed into perforated or non-perforated plastic liner can be placed above the sheet in the container.

In an embodiment the multilayer sheet of the present invention is mounted on the top of the agricultural product packed into perforated or non-perforated plastic liner in the container.

In an embodiment the two multilayer sheet can be used, or one sheet is efficient to control the post-harvest decay which may be depend on the weather and rate of infection occurred in the agricultural product.

Typically, one multilayer sheet is used to control the post-harvest decay in fruits for example grapes.

The loading of the active agent on the multilayer sheet is in the range from 1% to 60%. The solid mixture containing sodium metabisulphite is in the range between 104 $g/m^2$ to 70 $g/m^2$.

In an embodiment the sheet of the present invention is active until 120 days and the infection can be reduced by 95-100% for about 90 days during cold storage post-harvest life.

In an embodiment the dual release multilayer sheet is effective in inhibiting and controlling the fungal infection caused by *B. cinerea* in grapes for example Crimson, Italia and Red Globe.

Described below are sheets, however, the processes and the articles described herein are applicable to mono or dual release multilayer sheet made according to the present disclosure.

Figure 1A:
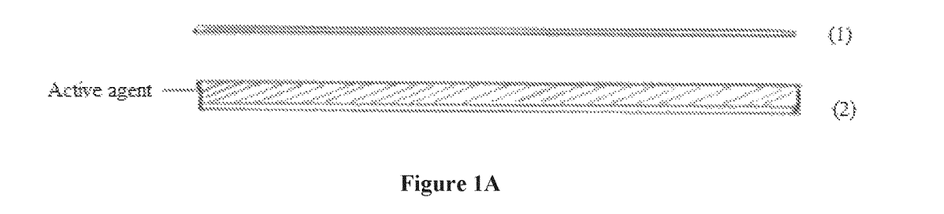
FIGS. 1A and 1B is representation of multilayer sheets according to one embodiment of the present invention.

Mono Release Sheet:

As shown in FIG. 1A, the mono release sheet normally used for fast release or slow release of the active agent for example sulphur dioxide to inhibit the microbial growth according to the present disclosure. The first layer is a polymeric layer (1) having a printable side of polymeric film on which a label is printed. The second layer is a polymer coated paper layer (2) and the polymeric side of this layer is printed with a composition comprising active agent, or its precursor optionally food grade resin. The label printed layer and the polymer coated paper layer are bonded to each other such that the polymer layer printed with active agent is protected from both sides to form a multilayer structure. The bonded layers may be further processed to form a sheet of a predetermined thickness. This multilayer sheet provides fast release of the active agent for inhibiting the microbial growth on the fruits. This fast release sheet is mainly used for transportation of fruits.

This sheet according to the invention can be placed or on the top of the fruit and/or at the bottom of the fruits in a bag or pack or packaging system, may be into a perforated or non-perforated liner, both cases, and packed in a box for transportation and/or for storage. This sheet has sufficient strength which can also protect the fruits from mechanical damage and condensation excess.

Figure 1B:
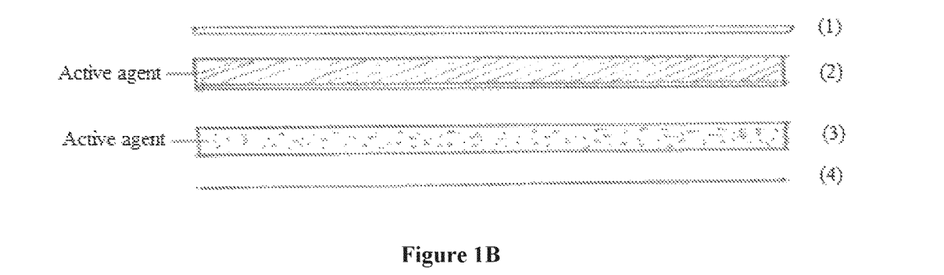

Dual Release Sheet:

Referring to FIG. 1B, the dual release sheet normally provides both fast release and control release of the active agent example sulphur dioxide simultaneously to effectively inhibit the microbial growth according to the present disclosure. The first layer is a polymeric layer (1) printed with label information on a printable side of polymeric film. The second layer is a polymer coated paper layer (2) and the polymeric side of this layer is printed with a composition comprising active agent, or its precursor. The third layer is a biodegradable paper layer (3) printed with a composition comprising active agent, or its precursor and food grade resin. All the three layers are dried. The fourth layer is a polymeric sealing layer (4). All the four sheets bonded to each other such that the layer printed with active agent is in the intermediate layers. The bonded layers may be further processed to form a multilayer structure of a predetermined thickness. This multilayer sheet provides fast and slow release of the active agent for inhibiting the microbial growth on the fruits. This dual release sheet is mainly used for storage of fruits for long period.

This sheet according to the invention is placed on the top of the fruits into the perforated or non-perforated liner and packed in a box for transportation and/or storage. This sheet can also protect the fruits from mechanical damage and condensation excess if placed inside the box, bottom part.

According to the present invention different compositions comprising an active agent or precursor of active agent can be engraved on to the substrate layer to form an active packaging sheet and can be used for various desired applications.

In an embodiment the multilayer sheet is engraved with composition comprising precursor of gaseous active agent selected from the group consisting of precursors of gaseous active agent like hydrogen peroxide precursors such as sodium perborate, percarbonate and/or other peroxide or natural/synthetic preservative or natural extracts.

In an embodiment the multilayer sheet is engraved with composition comprising an essential oil such as cynammon aldehyde.

In an embodiment the multilayer sheet is engraved with composition comprising an essential oil such as rosemary oil.

In an embodiment the multilayer sheet is engraved with composition comprising an essential oil such as thyme oil.

The multilayer sheet of the present invention can be used in various fruit preservation applications, not enumerated herein.

In another aspect the present invention provides use of a multilayer sheet comprising a polymeric layer and at least one active layer comprising a composition containing at least one active agent or its precursor for controlling growth of post-harvest pathogens during packaging, storing and/or transportation of agricultural products.

In one embodiment, the post-harvest pathogens include but not limited to *Alternaria, Botrytis, Fusarium, Penicillium* and *Sclerotinia*.

In one embodiment, the post-harvest pathogens/fungus include *Botrytis Cinerea*.

In another aspect the present invention provides a process for making a multilayer sheet, comprising the steps of:
a) printing a composition comprising at least one active agent or its precursor on a polymeric support to form a printed layer,
b) drying the printed layer; and
c) bonding one side of the printed layer with one side of a polymeric layer.

The present invention provides a method of making the multilayer sheet comprises printing a composition including at least one active agent or precursor of gaseous active agent on the coated side of the intermediate barrier layer support for example resin coated paper support or biodegradable resin coated paper support or resin coated polymeric layer support or biodegradable resin coated biodegradable polymeric layer support to form the active releasing film layer. The film is then dried to form a printing layer over the support.

The printed support layer is then bonded with the polymeric film layer on one side which may be printed with label. The resulting structure is then processed to print a composition comprising the active agent to form the second active releaser film layer which is printed over the non-printed layer of the barrier layer. The film is then dried to form a printing layer over the support.

The resulting structure is then sealed with a bottom layer to make the multilayer structure. With this method a dual release (fast and slow) multilayer sheet can be manufactured.

In an embodiment, the sheet according to the present invention is a two layer sheet.

In another embodiment, the sheet according to the present invention is a three layer sheet.

In another embodiment, the sheet according to the present invention is a four layer sheet.

In the case of two layers structure, mono release sheet, there are two alternatives. In the first one the method of making the multilayer sheet comprises printing a composition including at least one active agent or precursor of gaseous active agent on the polymeric support, or on biodegradable polymeric support, or on paper support, to form the active releaser film layer. The film is then dried to form a printing layer over the support. The printed layer is then bonded with the polymeric layer which may be printed with label. With this method a fast mono release sheet can be manufactured.

In an embodiment, the polymeric support is made of polymer selected from the group comprising polyethylene, polypropylene, polyester, polyamide, polylactic acid, polyvinyl chloride, polyethylene terephthalate, polyethylene terephthalate glycol, paper board aluminium, metal, polypropylene-viscose blended or combinations thereof.

An alternative method of making the multilayer sheet comprises printing a composition including at least one active agent or precursor of gaseous active agent over the coated side of the intermediate barrier layer support, to form the active releaser film layer. The film is then dried to form a printed layer support. The printed barrier layer is then bonded with the polymeric film layer on one side which may be printed with label on other side. With this method a slow mono release sheet can be manufactured.

Typically the composition to be printed on the support material comprises a solution and/or an emulsion of the volatile active agent (or its precursor) dissolved in suitable solvent such as alcoholic solvents together and at least one carrier as co-formulant such as silicates, like mineral such as xanthan gum or guar gum optionally includes food grade resins like cellulose-derived resins and/or modified starches, and/or oligosaccharides (dextrin and/or other oligosaccharides), and/or poly vinyl acetate, and/or polyacrylic acid and/or partially esterified polyacrylic acid.

In one embodiment, other co-adjuvants can be added in the composition like minerals such as silicates or other substances such as xanthan gum or guar gum.

The composition thus formed is then printed on the printable support material using printing techniques known to a person skilled in the art for example gravure printing technique. Preferably the printing of active agent is performed by rotogravure printing. The resulting printed layer is firmly bonded to a polymeric layer. The advantage of this applying the active agent on the support film is that it provides food safety and overcome the problems associated with the common coated ("laminated") sheets nowadays used in the market, that have the problem to release exhausted chemical from the coated layer. The present invention thus ensures a perfect homogeneous distribution of the all co-adjuvants components surrounding the active ingredient.

In an embodiment a gravure printing method of forming a multilayer structure comprises the following steps. The active agent is mixed with suitable liquid carriers to form a solution. According to each solution, dedicated gravure rollers are defined and selected for homogenous distribution of the active on the support material. The final roller of the first step has a transferring rate between 35% and 60% more verse normal food grade ink rate. The second gravure roller can be the same of the first or with a reduced rate (from 12 to 25% less), according to the solution type. The gravure rollers from step 3 on were selected with lower transferring rate, from 18 to 30% less. The impression roller distribution is by the way optimized in these last steps rollers to grant a fine tuning of the printing process. The printing solution of the slow release is distributed in several printing step. According to the active ingredients used in some case the composition can be modified from the first steps to the final ones, usually changing concentration and/or surfactants distribution) in order to optimize the final result. After each printing step a vertical double direction drying tunnel is placed at the exit of each printing step, before the entry of the next printing step. The tunnel is tuned from 65° C. to 120° C., according to the solution and/or the support. The ventilation inside each tunnel channel can be directed opposite or same direction verse the material flow. The air flows are ensured to have the highest possible laminar flow of drying air. The film speed is adjusted between 200 and 1500 linear meters/minute, according to the type of active ingredient and the related drying properties of the related solution. Once the multi-step printing process is completed the resulting printing layer is ready. The active printed layers are dried. In a next step the resulting structure is then coupled and bonded with suitable adhesives with one or more other support layers. Such multilayer structures can be prepared depending upon the desired application.

In an embodiment, the printed layer comprises a fast-release composition comprising active agent or its precursor.

In another embodiment, the printed layer comprises a slow-release composition comprising active agent or its precursor, and a control release agent.

In another embodiment, the printed layer allows fast release or slow release of the active agent or its precursor.

In an embodiment the sheet of the present invention is flexible and of sufficient mechanical strength to withstand and prolonged emission of the active, with lower sensitivity to the thermo-hygrometric condition's variation.

In an embodiment the sheet of the present invention provides high infection control as provided in the study conducted for 30 days, and improved results even at 90 days of storage.

In an embodiment the multilayer sheet of the present invention did not affect grape's quality parameter in case of typical stressful conditions.

In an embodiment the sheet prepared according to the present invention having homogeneous distribution of suitable gaseous active ingredient (or their precursors) and the emission adjusting co-adjuvants all over the surface thereby providing homogeneous volatiles emission.

In an embodiment the sheet comprising film of suitable gaseous active ingredient (or their precursors) included in the support such that chemical can't be directly in contact with fruit or the operator during use/when exhaust thereby making the sheet safe.

In an embodiment the sheet of the present invention sufficiently reduced $SO_2$ damage (bleaching) risk and bitter sulphur taste risk.

In the case of $SO_2$ type sheet, according to the present invention the sheets comprising the printed layer of a composition containing at least one precursor of gaseous active agent when packed with fruits provides better colour maintenance, reduced infection rate and higher susceptibility to phytotoxicity in case of stressful conditions. Preferably, the sheet can be advantageously used for transporting and storing the grapes in very healthy conditions at harvest.

In another aspect the present invention provides a package comprising a multilayer sheet comprising a polymeric layer and at least one active layer comprising a composition containing at least one active agent or its precursor, for controlling the growth of post-harvest pathogens in the packaged agricultural products.

In an aspect the present invention provides a multilayer sheet comprising a sheet engraved with a composition containing sulphur dioxide generator optionally with agrochemically acceptable carriers to control the fungus in fruits and vegetables during packaging, storage and/or transport of these agricultural products.

In an aspect the present invention provides a multilayer sheet comprising a sheet engraved with a composition containing hydrogen peroxide generator optionally with agrochemically acceptable carriers to control the microbiological contamination during packaging, transport and/or storage of agricultural products.

In an aspect the present invention provides a multilayer sheet comprising a sheet engraved with a composition containing essential oils optionally with agrochemically acceptable carriers to control the microbiological contamination during packaging, transport and/or storage of agricultural products.

In an aspect the present invention provides use of a multilayer sheet comprising a mono release sheet or dual release sheet printed with active agent composition in the stage of development or progression on surface contamination of agricultural products.

In an embodiment the present invention provides use of mono release sheet wherein said sheet allows fast release of active agents in the gaseous state to prevent or inhibit, delay and control fungal contamination in agricultural products during postharvest.

In an embodiment the present invention provides use of the dual release sheet for fast and controlled (slow) release of gaseous active agents simultaneously to prevent, delay, control, delay, microbiological contamination in agricultural products during postharvest.

In an embodiment the present invention provides use of the sheet according to any one embodiment of the present invention for inhibiting/treating or controlling/preventing microbiological contamination for agricultural product for example fruits or vegetables.

In an embodiment the present invention provides use of the sheet for fast and controlled release of gaseous active agents simultaneously to treat, prevent, delay, control, delay, microbiological contamination in agricultural products during postharvest.

In an embodiment the present invention provides use of the multilayer sheet for treating or controlling or preventing the microbiological contamination or fungus in table grapes of Red Globe during transportation and/or storage.

In an embodiment the present invention provides use of the two- or three-layers sheet comprising at least one printing layer of composition containing at least one precursor of gaseous active agent for treating or inhibiting development of microbial growth or fungus during the transportation and storage of grapes over long intervals.

In an aspect the present invention provides a method of using multilayer sheet, said method comprising contacting said sheet engraved with a composition containing at least one active agent or precursor of active agent, with agricultural products at pre-cooling stage after harvest operations.

In another aspect the present invention provides a method of controlling growth of post-harvest pathogens in agricultural products comprising contacting the multilayer sheet with agricultural products during packaging, storing and transportation.

In an aspect the present invention provides a method for treating or inhibiting the growth of fungi on fruits and/or vegetables comprising maintaining said agriculture products in a modified gaseous atmosphere generated from the sheet engraved with a composition comprising at least one precursor of active agent or precursor of active agent, such as sulphur dioxide at a temperature in the range of about $-1°$ C. to about $+8°$ C. for a time sufficient to inhibit growth of fungi in agriculture products.

In an aspect the present invention provides a method for inhibiting the growth of fungi on fruits and/or vegetables comprising maintaining said agriculture product in a modified gaseous atmosphere generated from the mono release sheet o layer sheet wherein at least one layer is engraved with a composition comprising at least one precursor of gaseous active agent at a temperature in the range of about $-1°$ C. to $+8°$ C. (fruit's temperature) for a time sufficient to inhibit growth of fungi on said fruits and/or vegetables.

In an aspect the present invention provides a process for inhibiting the growth of fungi on fruits and/or vegetables comprising maintaining said fruits and/or vegetables in a modified gaseous atmosphere generated from the three layer sheet wherein at least two layer are engraved with a composition comprising at least one precursor of gaseous active agent of which one layer is barrier layer to control the release of active agent, preferably sulphur dioxide at a temperature in the range of about $-1°$ C. to about $+8°$ C. for a time sufficient to inhibit growth of fungi on said fruits and/or vegetables.

In an embodiment the present invention provides a method for inhibiting microbial growth on a surface of agricultural product which comprises placing the sheet printed with a composition comprising at least one sulphur dioxide precursor, on the fruits, preferably in perforated/non-perforated PE bags and packed in a box at precooling stage after the fruits are removed from the field.

In an embodiment the present invention provides a method for treating fungus on a surface of agricultural product which comprises placing the sheet printed with a composition comprising at least one sulphur dioxide precursor, on the fruits, preferably in perforated/non-perforated PE bags and packed in a box at harvest stage.

In an embodiment the present invention provides a method for inhibiting microbial growth on a surface of agricultural product which comprises placing the sheet printed with a composition comprising at least one sulphur dioxide precursor, on the fruits, preferably in perforated/non-perforated PE bags and packed in a box after harvest and after pre-cooling/cooling the fruit.

In another aspect of this invention there is provided a package for transporting and/or storing fruits preferably table grapes comprising
 a) a container;
 b) optionally a water absorbent material lining said container;
 c) optionally, a plastic liner between the container walls and said absorbent material;
 d) a multilayer sheet engraved with a composition comprising at least one active ingredient or its precursor using rotogravure printing;
 e) an optional insert comprising instructions for use of the kit.

In an embodiment of present invention, the packing may be in the form of a sheet or any other form appropriate to place it inside the container having agricultural product.

Advantages of the Present Invention:
 i. The multilayer sheet of the present invention is biodegradable and ensures food safety by controlling the release of active substance from the printed layer.
 ii. The printing techniques ensures a homogeneous distribution of the co-adjuvant components surrounding the active substance. This enables to avoid any preferential channel and short circuits of the active substances which may arise due to rough dispersions of the active substance.
 iii. The manufacturing process of the multilayer sheet of the present invention allows to use different active substances in the same sheet.
 iv. The multilayer sheet of the present invention is an environment-friendly product as it uses biodegradable materials in the layers.
 v. The multilayer sheet of the present invention also meets the aesthetic requirements of the post-harvest chain.
 vi. The multilayer sheet of the present invention reduces the water excess in the packaging system leading to condensation that promotes microbial growth or fungus in agriculture products.
 vii. The package system of the present invention enables ease of handling, ease of use, reduced spillage and waste disposal.
 viii. The multilayer sheet of the present invention enables the release of $SO_2$ from the bottom of the sheet as well as from the edges of the sheet.
 ix. The multilayer sheet improved $SO_2$ damage as compared to conventional sheets and significantly reduced the damage of fruits
 x. The multilayer sheet significantly reduced the incidence of *Botrytis* fungus development without affecting the stem colour and without any bleaching effect.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above described embodiment, method, and examples, but by all embodiments and methods within the scope and spirit of the invention.

EXAMPLES

Example 1: Post-Harvest Trial

Evaluation of stored grapes that were packed in perforated or non-perforated liners with or without active generator sheets was performed. The following parameters are tested for a period of 30 days to 90 days.
Postharvest Treatment on Table Grapes:
 The test involved the application of multilayer sheet of the present invention, when grapes are packed in the field, before the precooling of grapes and immediately after the pre-refrigeration of grapes.

Materials and Methods

Materials:
 Clusters of cv Italia and cv Red Globe table grapes were harvested in two vineyards, located respectively in the countryside of Sannicandro di Ba and Casamassima in the province of Bari. In both cases, the grapes were collected in the early morning and packed in wooden boxes with size of 30×50 cm and a capacity of 7-8 kg. The boxes were labeled according to the plastic bag used (Perforated, Non-Perforated and modified atmosphere packaging (MAP)). Then sheet was placed in the boxes according to the Table 1 and Table 2. In particular, the boxes were marked with the initials C (generator added to the field), P (generator inserted before precooling) and D (generator inserted after precooling).

A bottom layer of soft absorbent pad was laid inside the plastic liner, over the wooden box, to prevent moisture excess and problem (micro injuries) coming from the contact with container. After 30 and 90 days of storage, the following parameters were examined: development of rots and evaluation of the microbial population.

TABLE 1

Scheme of the trials carried out on cv "Italia" grapes

| | Packing | Liner type | Storage (dd) |
|---|---|---|---|
| cv "Italia" | Field | F (with holes) | 30 |
| | | | 60 |
| | | NF (No Holes) | 30 |
| | | | 60 |
| | | MAP (Modified atmosphere) | 30 |
| | | | 60 |
| | Before precooling | F (with holes) | 30 |
| | | | 60 |
| | | NF (No Holes) | 30 |
| | | | 60 |
| | | MAP (Modified atmosphere) | 30 |
| | | | 60 |
| | After precooling | F (with holes) | 30 |
| | | | 60 |
| | | NF (No Holes) | 30 |
| | | | 60 |
| | | MAP (Modified atmosphere) | 30 |
| | | | 60 |

TABLE 2

Scheme of the trials carried out on "Red Globe" grapes

| | Packing | Liner type | Storage (dd) |
|---|---|---|---|
| Red Globe | Field | F (with holes) | 30 |
| | | | 60 |
| | | NF (No Holes) | 30 |
| | | | 60 |
| | | MAP (Modified atmosphere) | 30 |
| | | | 60 |
| | Before precooling | F (with holes) | 30 |
| | | | 60 |
| | | NF (No Holes) | 30 |
| | | | 60 |
| | | MAP (Modified atmosphere) | 30 |
| | | | 60 |
| | After precooling | F (with holes) | 30 |
| | | | 60 |
| | | NF (No Holes) | 30 |
| | | | 60 |
| | | MAP (Modified atmosphere) | 30 |
| | | | 60 |

Figure 2A:
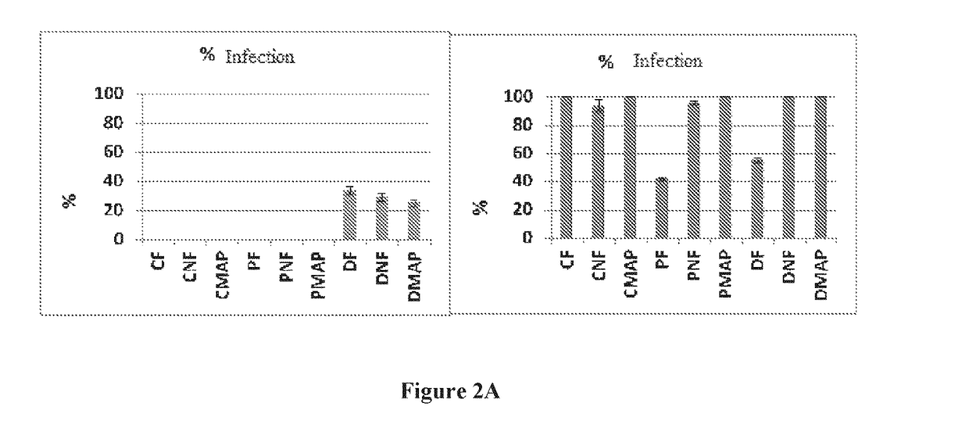
FIGS. 2A and 2B are graph representing *Botrytis cinerea* infection on grapes cv Red Globe and cv Italia packaging with (left) and without multilayer sheet of present invention.
Figure 2B:
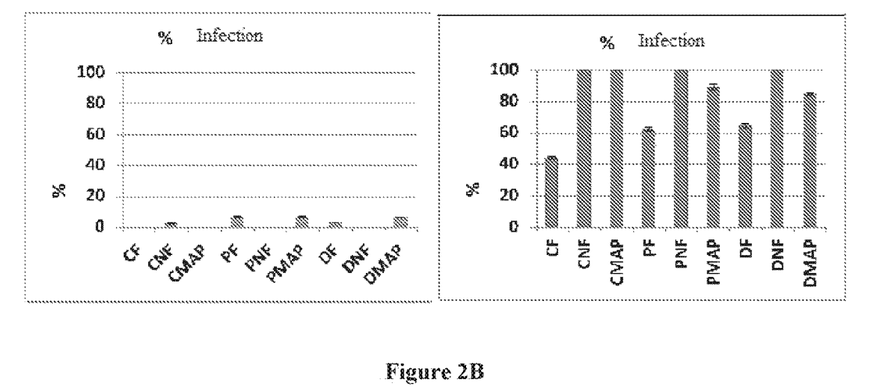

Results after 30 Days and 90 Days of Cold Storage:
1) Infection Evaluation
   1. It was observed that without multilayer sheet of the present invention the infections reached almost 100% for both cultivars as shown in FIG. 2A and FIG. 2B.
   2. With multilayer sheet of the present invention just before the pre-refrigeration (treatment P) showed no infection by *Botrytis cinereal*.

Example 2: Study of Epiphytic Microbial Population

The natural microbial population present on the surface of the berries in the treatments in which multilayer sheet of present invention were applied was virtually absent; while on the berries stored without active generator, population showed values ranging from 0 up 60 UFC per gram of grapes with definitively lower values in the treatments with perforated plastic bags.

It has been concluded from the above study that the sheet must be placed before cooling and packing with perforated bags leads to minor infection incidence.

Example 3: Evaluation of $SO_2$ Level $SO_2$ level inside the box was measured in all boxes at 37, 60 and 90 days by mean of electronic $SO_2$ probe calibrated before any set of measurements. After 90 days of the storage it provided stable values. Perforated Bags determined lower values, while higher values were typically detected inside boxes packed with Non-perforated bags and MAP bag (allowing some gas transpiration).

Example 4: Taste, Damages and Power Release Test

Taste:

This taste testing was performed by subjecting the grape box to cold chain interruption (condensation generation) event for 72 hours. A group of 4 experts were selected for evaluation. Blinded Panel taste was performed according to the following protocol: Multilayer sheet was removed from the 20 boxes that faced cold chain interruption event. Each expert judged presence of sulphur smell tasting two berries coming from each box. Tasting technique: each berry was crushed between tongue and palate and taken deep breathing for ¾ seconds. The results of taste testing are given in Table 3.

TABLE 3

Results of taste testing
Taste damage

| Panel test | Multilayer sheet of present invention | Traditional $SO_2$ pad |
|---|---|---|
| 1 | 5% | 65% |
| 2 | 0% | 55% |
| 3 | 0% | 50% |
| 4 | 5% | 65% |
| AVG | 3% | 59% |

Figure 6:
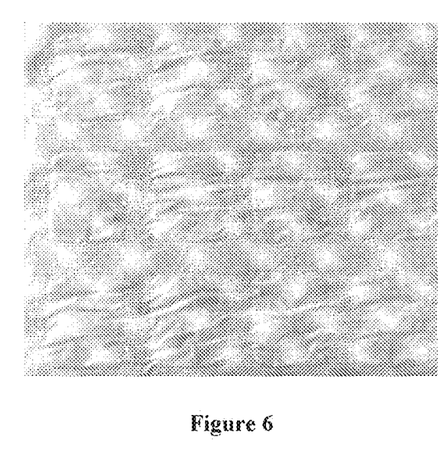
FIG. 6 shows the conventional pads containing the active ingredient in pouches.

Damage:

This test was conducted to evaluate the damage of fruits. The conventional pads containing powder in pouches as shown in FIG. 6 are affected by high risk of too high $SO_2$ coming from the powder that accumulates in the corners or on a side of the pouches once the pad is placed vertical before laying down over the grape. The results of damage test are given in Table 4.

TABLE 4

Results of damage test

Bleaching, % of bunches affected after condensation event (lab test)

| Multilayer sheet of present invention | Traditional pad |
|---|---|
| 0% | 12% |

Bleaching after storage/transport

| Storage days | Multilayer sheet of present invention | Traditional pad |
|---|---|---|
| 35 | 0% | 6% |

Powder Release Test:

This test was conducted to evaluate the release of solid residue of compound used in the packaging sheets. The results of powder release test are given in Table 5.

TABLE 5

Results of powder release test
Powder release test (food safety), mg

| Storage days | Multilayer sheet of present invention | Laminated (coated) market reference |
|---|---|---|
| 25 | 0 | 10 |
| 50 | 0 | 70 |

It has been concluded from the above studies that multilayer structure of the present invention showed stable and prolonged emission, not affected by thermo-hygrometric conditions variation. It showed high infection control for 30 days, which is excellent at 90 days. It did not affect grape's quality parameter in case of typical stressful conditions.

Example 5: Controlled Release: $SO_2$ Damage Protection Characteristics Evaluation In the area of Bari (Europe), with a recorded environmental temperature of 28.5° C. and recorded environmental relative humidity of 78%, 16 boxes of Table grape were harvested and packed in the field using the following conditions:
1) T0: no sheet (Control)
2) T1: with the multilayer sheet of the present invention
3) T2: with conventional multilayer sheet containing the active agent in desiccated pouches form as shown in FIG. 6

Figure 3:
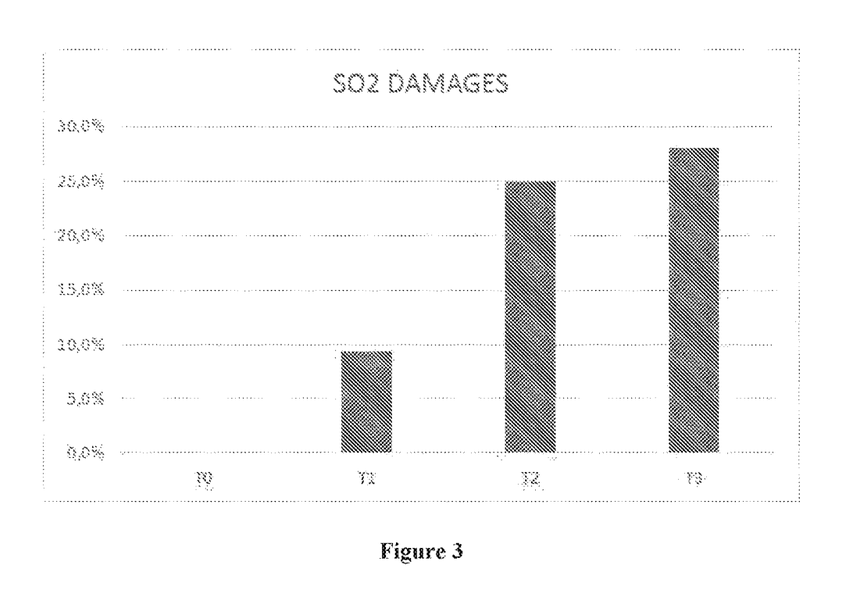
FIG. 3 shows the result of $SO_2$ damage in the packaging with and without multilayer sheet of present invention.

The grape was maintained for 4 hours in the field, simulating therefore the typical stressful conditions that often occurs during field packing operations. Then, the grapes were transferred to a pack house and stored in cold storage room at temperature of 1° C. After one week the grapes were examined. The number of bunches with evidence of $SO_2$ damage was recorded and the results are shown in FIG. 3. As shown in FIG. 3, the problem of bleaching of $SO_2$ was significantly reduced using the present invention instead of traditional uncontrolled sheet.

Example 6: Efficacy Evaluation

In order to evaluate the effectiveness and the previously described damage protection features the mono release type of the present invention, dedicated to protecting grape for fresh transportations, the multilayer sheet was tested at different level. The following trials were designed and performed.

Figure 4A:
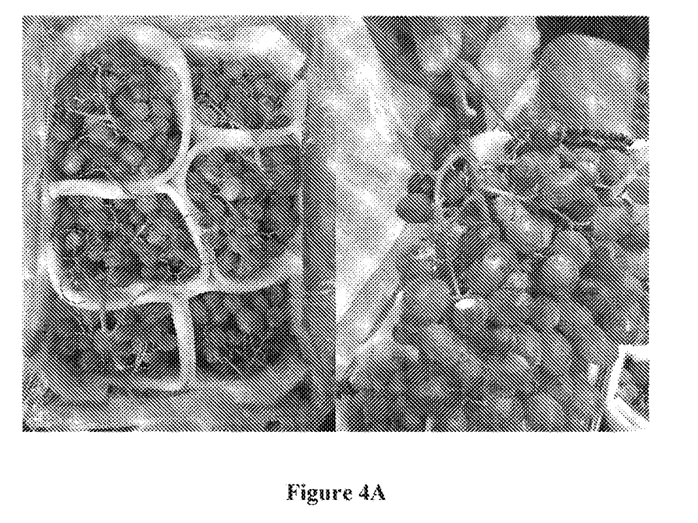
FIG. 4A shows images of the boxes packed without the multilayer sheet of the present invention.
Figure 4B:
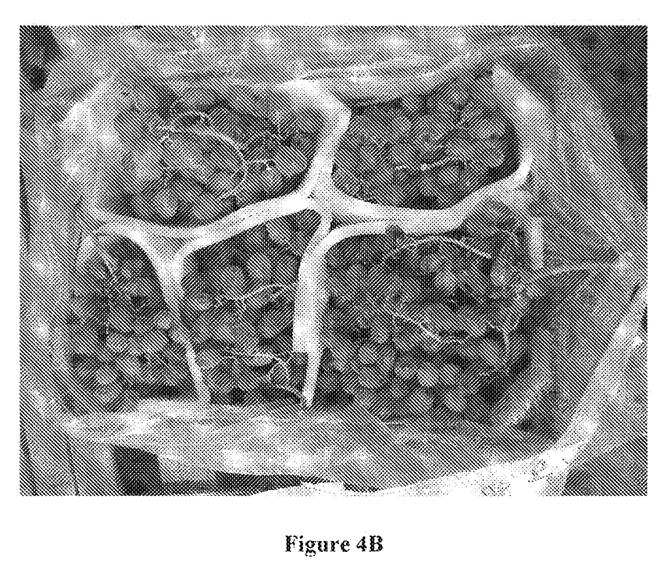
FIG. 4B shows images of the boxes packed with the multilayer sheet of the present invention.

External Pack House Trial:

In a vineyard located in Rutigliano, Bari, Italy, 6 groups of boxes of variety "Crimson" were packed using below listed sheets. After storing the boxes for 25 days at temperature of 1° C. the grapes were evaluated. The results are shown in Table 6. The images of the boxes packed without the multilayer sheet of the present invention is shown in FIG. 4A. The images of the boxes packed with the multilayer sheet of the present invention is shown in FIG. 4B.
1) C-T0: vented bag with no sheet (Control)
2) C-T1: vented bag with the multilayer sheet of the present invention

TABLE 6

Results of efficacy of the multilayer sheet of the present invention on "Crimson"

| TESI | ID | RIP. | BOTR. | BOTR. Avg | S.C.E. | S.C.E. Avg |
|---|---|---|---|---|---|---|
| CRI BAG | C - T0 | R1 | 1 | 1, 2 | 4 | 4 |
|  |  | R2 | 1 |  | 4 |  |
|  |  | R3 | 1 |  | 4 |  |
|  |  | R4 | 2 |  | 4 |  |
|  |  | R5 | 1 |  | 4 |  |
| CRI C.F. + BAG | C - T1 | R1 | 0 | 0 | 4 | 4 |
|  |  | R2 | 0 |  | 4 |  |
|  |  | R3 | 0 |  | 4 |  |
|  |  | R4 | 0 |  | 4 |  |
|  |  | R5 | 0 |  | 4 |  |

The above results clearly show that, in case of the most sensitive variety, the product of the present invention significantly reduced the incidence of *Botrytis* fungus development without affecting the stem colour and without any bleaching effect. As secondary result of the present trial, it is confirmed that the practice to pack Table grape using the pallet cover instead of single box bag lead to worse stem colour (SCE degree).

Figure 5A:
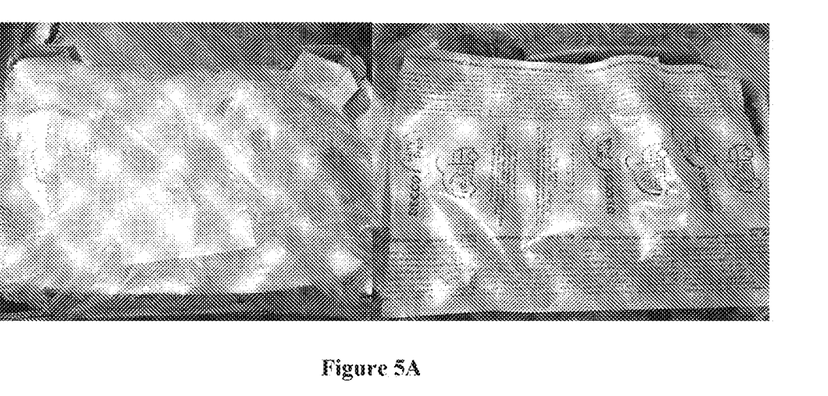
FIG. 5A shows the packaging of Crimson grapes with the multilayer sheet of the present invention.
Figure 5B:
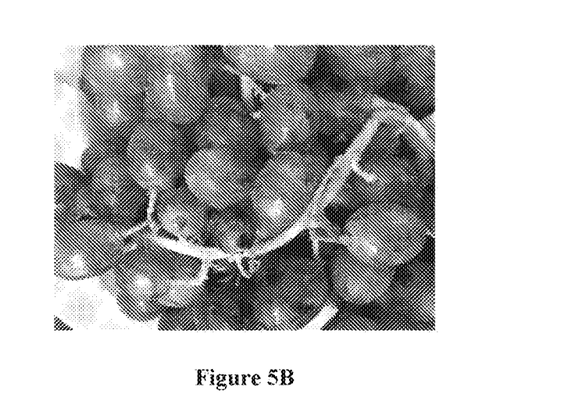
FIGS. 5B and 5C show the Crimson grapes packed with the multilayer sheet of the present invention.
Figure 5C:
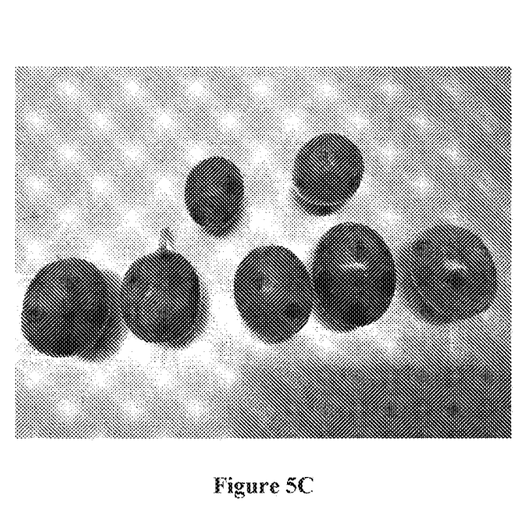

External Delivery Trial:

The effectiveness of the present invention was tested in a practical commercial transport situation in a Table grape pack house located at Rutigliano (Bari). Some groups of boxes of variety "Crimson" were packed using below listed sheets with same procedure. The boxes were then sent through a regular refrigerated truck to the logistic platform of a supermarket. At the arrival, the boxes were transferred to a cold storage of a QC table grape lab at the supermarket and left still for 2 more days. The quality parameters were analysed, and the qualitative results are shown in FIGS. 5A, 5B and 5C. As shown in FIG. 5B, the stem colour was between 95% and 100% green and the grapes had good crispness. As shown in FIG. 5C, there were 5 split grapes and two punctured grapes among the 10×500 g of Table grapes.

The above results clearly show that, the multilayer sheet of the present invention enabled the grapes to have high sugar content without affecting taste, zero trace of $SO_2$ damage, rare split of grapes, and maintenance of freshness of grapes.

The invention claimed is:
1. A multilayer sheet, comprising:
 a polymeric layer; and
 at least one active layer comprising a composition containing at least one active agent or its precursor selected from the group consisting of sodium meta bisulphite, sodium bisulfite, sodium sulphite, potassium metabisulphite, sodium percarbonate, 1-MCP generators, essential oils, chlorine dioxide generators, hydrogen peroxide generator, and acetic acid, wherein said at least one active layer comprises a printed layer and/or a barrier layer, and wherein the composition containing the at least one active agent or its precursor is printed on said at least one active layer.

2. The multilayer sheet according to claim 1, wherein the at least one active layer comprises the printed layer.

3. The multilayer sheet according to claim 1, wherein the at least one active layer comprises the barrier layer.

4. The multilayer sheet according to claim 1, wherein the at least one active layer comprises the printed layer and the barrier layer.

5. The multilayer sheet according to claim 1, wherein said polymeric layer and the at least one active layer are biodegradable.

6. The multilayer sheet as claimed in claim 1, wherein said polymeric layer and the at least one active layer are bonded using a biodegradable food grade adhesive material to form the multilayer sheet.

7. The multilayer sheet according to claim 1, wherein said at least one active agent or its precursor comprises the sodium metabisulphite.

8. The multilayer sheet according to claim 1, wherein an amount of the at least one active agent or its precursor in the composition is about 1 to 99% by weight based on the weight of the at least one active layer.

9. The multilayer sheet according to claim 1, wherein the composition further comprises an agrochemically acceptable carrier.

10. The multilayer sheet according to claim 1, wherein said polymeric layer comprises a polymer selected from the group consisting of polyethylene, polypropylene, polyester, linear high density polyethylene, high density polyethylene, semi-water semi-permeable polymer, polyamide, polylactic acid, polyvinyl chloride, polyethylene terephthalate, polyethylene terephthalate glycol, paper board aluminium, polypropylene-viscose blend, polycarbonate based resin, polyolefin based resin, and combinations thereof.

11. The multilayer sheet according to claim 1, wherein said printed layer comprises a polymer selected from the group consisting of polyethylene, polypropylene, polyester, polyamide, polylactic acid, polyvinyl chloride, polyethylene terephthalate, polyethylene terephthalate glycol, paper board aluminium, polypropylene-viscose blended and combinations thereof.

12. The multilayer sheet according to claim 1 wherein said barrier layer is a resin coated paper or a resin coated polymer.

* * * * *